(12) United States Patent
Potter et al.

(10) Patent No.: US 12,427,804 B1
(45) Date of Patent: Sep. 30, 2025

(54) WHEEL PROTECTOR FOR A TWO-PART WHEEL

(71) Applicant: Advanced Simulation Technology, Incorporated, Aston, PA (US)

(72) Inventors: Alvin Andrew Potter, Media, PA (US); Bryan Thomas Rogers, Philadelphia, PA (US); Wesley Alvin Potter, West Chester, PA (US)

(*) Notice: Subject to any disclaimer, the term of this patent is extended or adjusted under 35 U.S.C. 154(b) by 408 days.

(21) Appl. No.: 17/962,664

(22) Filed: Oct. 10, 2022

Related U.S. Application Data

(60) Provisional application No. 63/257,448, filed on Oct. 19, 2021.

(51) Int. Cl.
  *B60B 7/01* (2006.01)
  *B60B 7/06* (2006.01)
  *B60B 7/14* (2006.01)

(52) U.S. Cl.
  CPC ............... *B60B 7/01* (2013.01); *B60B 7/063* (2013.01); *B60B 7/14* (2013.01); *B60B 2900/212* (2013.01)

(58) Field of Classification Search
  CPC .. B60B 7/01; B60B 7/06; B60B 7/063; B60B 7/068; B60B 7/14; B60B 7/165; B60B 2900/212; F16B 37/14; F16B 5/06
  USPC .................... 301/37.24; 411/372.5, 373, 377
  See application file for complete search history.

(56) References Cited

U.S. PATENT DOCUMENTS

| | | | |
|---|---|---|---|
| 988,039 A | 3/1911 | Slavin | |
| 2,432,531 A | 12/1947 | Lyon | |
| 2,526,026 A | 10/1950 | Horn | |
| 3,356,421 A | 12/1967 | Trevarrow | |
| 3,724,905 A | 4/1973 | Kachler | |
| 3,860,297 A | 1/1975 | Solis | |
| 3,909,065 A * | 9/1975 | Main | B60B 3/08 301/63.102 |
| 4,593,953 A | 6/1986 | Baba | |
| 4,761,040 A * | 8/1988 | Johnson | B60B 7/14 301/37.38 |
| 4,842,339 A | 6/1989 | Roulinson | |
| 4,884,933 A * | 12/1989 | Preusker | F16B 33/00 403/287 |
| 4,971,396 A * | 11/1990 | Morris | B60B 7/14 301/108.4 |
| 4,974,909 A | 12/1990 | Patti | |

(Continued)

FOREIGN PATENT DOCUMENTS

| | | | |
|---|---|---|---|
| WO | 2013/009729 | 1/2013 | |
| WO | WO-2022053421 A1 * | 3/2022 | ............... B60B 7/01 |

OTHER PUBLICATIONS

U.S. Appl. No. 61/073,897, filed Jun. 19, 2008. (Year: 2008).*

*Primary Examiner* — S. Joseph Morano
*Assistant Examiner* — Eva L Comino
(74) *Attorney, Agent, or Firm* — Robert J. Yarbrough of Lipton, Weinberger & Husick

(57) ABSTRACT

The Invention is a wheel protector for a two-part wheel for a motor vehicle. The wheel protecter is generally annularly shaped and includes collars that closely conform to threaded rim nuts that secure the inner rim and outer rim of the two-part wheel. The collars have collar inside surface shapes that conform to the threaded rim nut shapes for every angular orientation of the threaded rim nuts. The collars have collar outside surface shapes that conform to mating wheel protector opening shapes for every angular orientation of the threaded rim nuts.

16 Claims, 14 Drawing Sheets

(56) References Cited

U.S. PATENT DOCUMENTS

| | | | | |
|---|---|---|---|---|
| 5,031,965 A | * | 7/1991 | Buerger | B60B 7/04 |
| | | | | 301/108.4 |
| 5,071,197 A | * | 12/1991 | Webster | B60B 7/08 |
| | | | | 301/37.372 |
| 5,150,949 A | * | 9/1992 | Wang | B60B 7/0046 |
| | | | | 301/37.371 |
| 5,163,739 A | * | 11/1992 | Stanlake | B60B 7/08 |
| | | | | 301/108.4 |
| 5,222,785 A | | 6/1993 | Green | |
| 5,294,189 A | * | 3/1994 | Price | B60B 7/068 |
| | | | | 301/108.4 |
| 5,630,653 A | | 5/1997 | Polka | |
| 6,848,751 B1 | | 2/2005 | Yuan | |
| 6,926,369 B2 | | 8/2005 | McCaster | |
| 6,945,609 B2 | | 9/2005 | Barney | |
| 8,388,293 B2 | * | 3/2013 | Hutter, III | F16B 37/14 |
| | | | | 411/431 |
| 9,333,798 B2 | * | 5/2016 | Maeyama | B60B 25/002 |
| 9,511,624 B2 | | 12/2016 | Polka | |
| 9,707,800 B2 | | 7/2017 | Stratton | |
| 9,731,562 B2 | * | 8/2017 | Smith | B60C 7/24 |
| 10,703,132 B2 | | 7/2020 | Wren | |
| 11,198,322 B2 | | 12/2021 | Fleck | |
| 2010/0066155 A1 | * | 3/2010 | Seradarian | B60B 7/01 |
| | | | | 301/37.102 |
| 2011/0175432 A1 | * | 7/2011 | Rogers | F41H 7/00 |
| | | | | 301/62 |
| 2015/0210110 A1 | | 7/2015 | Rose | |

* cited by examiner

Prior art

WHEEL PROTECTOR FOR A TWO-PART WHEEL

I. BACKGROUND OF THE INVENTION

A. Field of the Invention

The Invention is a wheel protector for a two-part wheel used for off-road motor vehicle applications. An example of such an application is rock crawling using reduced air pressure in a four-wheel-drive vehicle. The wheel protector of the Invention provides sacrificial wear surfaces to absorb damage from collision or abrasion by rocks or other obstacles and to reduce damage to the two-part wheel itself.

B. Statement of the Related Art

Two-part wheels are popular with persons who enjoy off-road rock crawling in four-wheel-drive motor vehicles because the two-part wheel allows the wheel and tire combination to run with low air pressure. A popular brand of two-part wheels is manufactured by Hutchinson Industries, Inc. A typical two-part wheel comprises an inner rim and an outer rim. The outer rim is outward-facing when the two-part wheel is installed on the motor vehicle.

The inner rim includes a plurality of threaded studs, for example, eighteen studs, disposed about the circumference of the inner rim. The actual number of studs may vary depending on the size of the two-part wheel. The studs extend through stud openings disposed about the circumference of the outer rim. Threaded rim nuts engage the studs and secure the outer rim to the inner rim. An O-ring is disposed between the inner rim and outer rim to make the connection airtight and allow a tire mounted to the two-part wheel to run without an inner tube. An air valve penetrates the outer rim.

The two-part wheel may include a bead locker to prevent the tire bead from separating from the two-part wheel under conditions of low air pressure and high torque, as when the motor vehicle is crawling over a rock. The bead locker comprises a rubber or other resilient ring that spans the width of the tire at the bead and that presses the opposing sides of the tire bead against corresponding depressions in the inside of the inner rim and outer rim. The bead locker provides resilient pressure to hold the tire bead against the inner rim and outer rim when the air pressure is insufficient to do so.

Some of the threaded studs, for example, three or four, that penetrate the outer rim are long studs that are longer than the remaining short studs. The long studs are distributed about the circumference of the two-part wheel and assist in pulling the opposing inner rim and outer rim together during assembly of the wheel and tire combination. The long studs also provide a safety feature during the disassembly of the two-part wheel and tire combination. The long studs may hold the inner rim and outer rim together until the remaining threaded rim nuts are removed and ensure a controlled, rather than an explosive, release of air if the installer neglects to fully deflate the wheel and tire combination prior to disassembly.

The exposed threaded rim nuts and studs each may be covered by a nut cap. The nut cap may be composed of a polymer and protects the threaded rim nut and stud from corrosion and damage.

The two-part wheels generally are composed of painted aluminum and are subject to damage due to the very challenging environment in which the wheels are used. A wheel may, and likely will, impact a rock or other obstacle on the outer edge of the inner rim or outer rim, causing radial abrasion and scoring of the outer rim of the wheel. The wheel may experience impacts from rocks or other obstacles normal to the wheel disk. The wheel may rotate when the side of the wheel is in contact with the rock or other obstacle, causing torsional abrasion or further annular damage to the wheel.

The prior art does not teach the wheel protector of the Invention.

II. BRIEF DESCRIPTION OF THE INVENTION

The Invention is a wheel protector for a two-part wheel for a motor vehicle. The wheel protector has a body having a generally annular shape. The annular body has a wheel protector outside edge and a wheel protector inside edge. The annular body of the wheel protector is oriented generally parallel to the wheel outer rim of the two-part wheel when the wheel protector is installed on the two-part wheel. The wheel protector outside edge extends to the wheel outer edge of the wheel outer rim, where the wheel outer rim meets the tire. The wheel protector outside edge may extend beyond the wheel outer edge. The wheel protector inside edge extends to encounter the long studs.

An attachment mechanism comprises two or more wheel protector openings defined by the annular body, two or more collars that correspond to the wheel protector openings, and two or more wheel protector nuts. Each of the collars fits over a threaded rim nut on a long stud and engages a wheel protector opening in the body. The wheel protector nuts attach the body to the three or four long studs over the collars. The combination of the wheel protector openings, collars, and wheel protector nuts secures the wheel protector to the long studs and conform to any angular orientation of the threaded rim nuts on the long studs The plurality of collars each has a generally cylindrical outside surface that may be tapered, a collar clearance hole for a long stud, and a collar inside surface that corresponds to the shape of the threaded rim nut on the long stud. Where the outside of the threaded rim nut is hexagonal, the collar inside surface also is hexagonal. The number of collars corresponds to the number of long studs on the two-part wheel.

The wheel protector body defines the plurality of wheel protector openings that correspond in location to the long studs when the wheel protector is installed on the wheel. Each of the wheel protector openings is configured to receive one of the collars. If the collar outside surface is tapered, the wheel protector opening also is tapered to mate with the tapered collar outside surface. The wheel protector also defines a plurality of wheel protector clearance holes penetrating through the wheel protector openings. Each of the wheel protector clearance holes is coaxial with one of the long studs when the wheel protector is installed on the wheel.

The collar may be more resilient than the body to absorb force applied to the wheel protector. For example, the collar may be composed of a resilient polymer. The collar may comprise a collar shell and a collar core. The collar shell defines the collar outside surface. The collar core fits within the collar shell and defines the collar inside surface. The collar may feature a slot that allows the collar to expand to fit over a threaded rim nut and to contract when compressed by the mating tapers of the tapered collar outside surface and the tapered wheel protector opening.

The collar core conforms to the threaded rim nut and may be more resilient than the collar shell. The resilient collar core may dispense with the slot. The resilient collar core compensates for the assembly tolerances present in the assembly of the two-part wheel and wheel protector. The resilient collar core allows the wheel protector to seat around the long studs. Any misalignment in the long studs' bolt circle diameter is equally equilibrated during assembly. The collar allows the wheel protector to engage the threaded rim nut for any angular orientation of the rim nut on the long stud. In the absence of the collar, the wheel protector could engage only the points of the threaded rim nuts and would be capable of transferring much less force to the base of the long stud than is the case with a collar that matches the shape of the threaded rim nut.

The collar also serves to stand off the wheel protector from the wheel outer rim, preventing unwanted rattling, buzzing or other vibration of the wheel protector against the rim and reducing abrasion of the wheel protector against the wheel outer rim. The user may select among collars of different lengths to choose the separation between the wheel protector and the wheel outer rim.

To install the wheel protector of the Invention, a user will remove the polymer nut cap over the long studs exposing the threaded rim nut at the base of the long stud. The user will then place the collars over the rim nuts on the long studs. The user will rotate the collar so that the hexagonal opening of each collar core mates with the hexagonal threaded rim nut on each long stud. If the threaded rim nut is not hexagonal, the shape of the opening of the collar core is selected to match the shape of the rim nut. The user then will locate the wheel protector so that each long stud penetrates one of the wheel protector clearance holes through the wheel protector. The collar outside surface engages a wheel protector opening of the wheel protector. The engagement of the collar outside surface and the wheel protector opening may be a tapered engagement. The user secures the wheel protector to the wheel by the plurality of wheel protector nuts, with each wheel protector nut in threaded engagement with one of the long studs.

When installed, the outside edge of the wheel protector may extend beyond the outer edge of the wheel outer rim where the wheel outer rim meets the tire. The outer edge of the wheel outer rim is a frequent location for damage to the wheel outer rim from rocks or other obstacles. By extending the wheel protector to or beyond the edge of the wheel outer rim, the wheel protector may absorb force from an obstacle and convey that force to the base of the long studs before the force reaches the wheel outer rim of the wheel.

The wheel protector defines box sections that substantially reinforce the wheel protector, increasing the stiffness of the wheel protector and reducing flexure of the wheel protector. The box section also provides protection to the short studs. If the wheel protector deforms due to external forces normal to the wheel disk, the wheel protector may encounter the wheel outer rim, preventing further deformation of the wheel protector. The wheel protector protects the wheel outer rim from abrasion and damage from whatever applies the external force to the wheel protector. The box-shaped reinforcements also serve to stiffen the wheel protector against angular deformation due to a torsional load, as when the wheel rotates with the wheel protector lodged against a rock, and in a radial direction, as when the vehicle rolls over an obstacle that pushes against the edge of the wheel protector.

The box-shaped reinforcements also serve as stand-offs to limit the travel of the wheel protector in the axial direction when the wheel protector experiences a side load normal to the plane of the wheel disk. If a side load overcomes the stiffness of the wheel protector, the wheel protector will deflect axially until the box-shaped reinforcements touch the wheel outer rim. The wheel outer rim then supports the wheel protector against the side load and prevents further axial movement of the wheel protector. In a similar manner, the box-shaped reinforcements serve as stand-offs in the radial direction against force applied in the radial direction against the wheel protector. In the event that a radial load is applied against the wheel protector, the wheel protector may deform to contact the wheel outer rim, which supports the load.

The wheel protector transfers force applied to the wheel protector to the base of the long stud regardless of the angular orientation of the threaded rim nut that engages the long stud and attaches the wheel outer rim to the wheel inner rim. In the absence of an external force, the wheel protector touches the wheel outer rim only at the location of the long studs, avoiding rattling or buzzing of the wheel protector against the wheel outer rim and avoiding abrasion of the wheel protector against the wheel outer rim.

The body of the wheel protector may be composed of cast or machined aluminum, unfilled or glass-filled polymer such as PC+ABS or PC+PBT, as those terms are used in the polymer art, or any thermoplastic polymer having substantial strength and abrasion resistance. The wheel protector outside edge and wheel protector inside edge may feature reinforcements to resist abrasion damage or breakage of the wheel protector at the wheel protector outside edge and wheel protector inside edge. For example, the wheel protector may feature a ring of metal, such as stainless steel, molded into the wheel protector inside or outside edge to resist the penetration of the wheel protector by an obstacle and to resist abrasion of the wheel protector by the obstacle. Other potentially vulnerable locations on the body of the wheel protector may be reinforced, such as the wheel protector clearance holes, either by molding abrasion- or breakage-resistant materials into the polymer body or by increasing the thickness of the polymer. The reinforcements may be metal such as stainless steel or any high-strength composite material.

III. BRIEF DESCRIPTION OF THE DRAWINGS

IV. DESCRIPTION OF AN EMBODIMENT

Figures 1A, 1B:
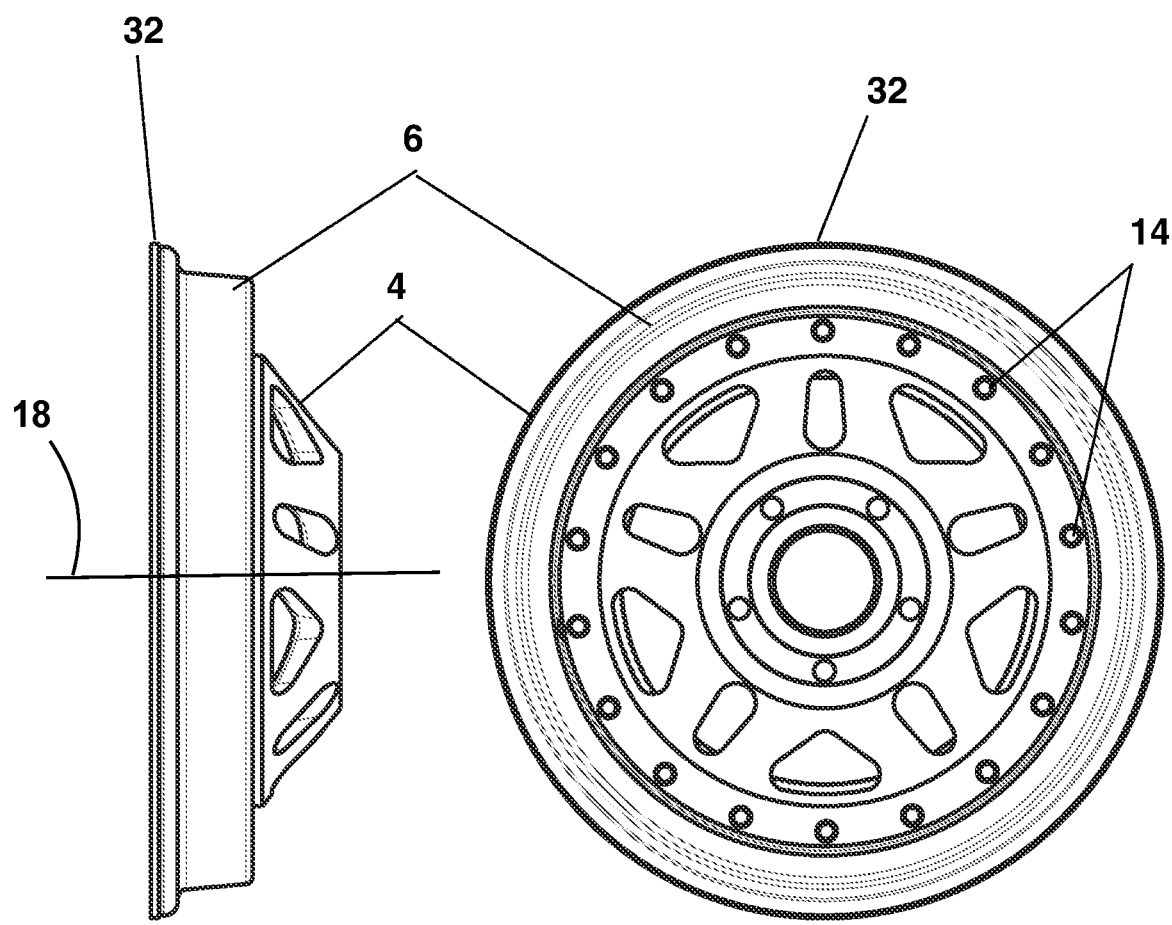
FIG. 1A is left side view of the wheel outer rim of a Hutchinson Industries two-part wheel.
FIG. 1B is a front view of a wheel outer rim of the two-part wheel of FIG. 1A.
Figure 6:
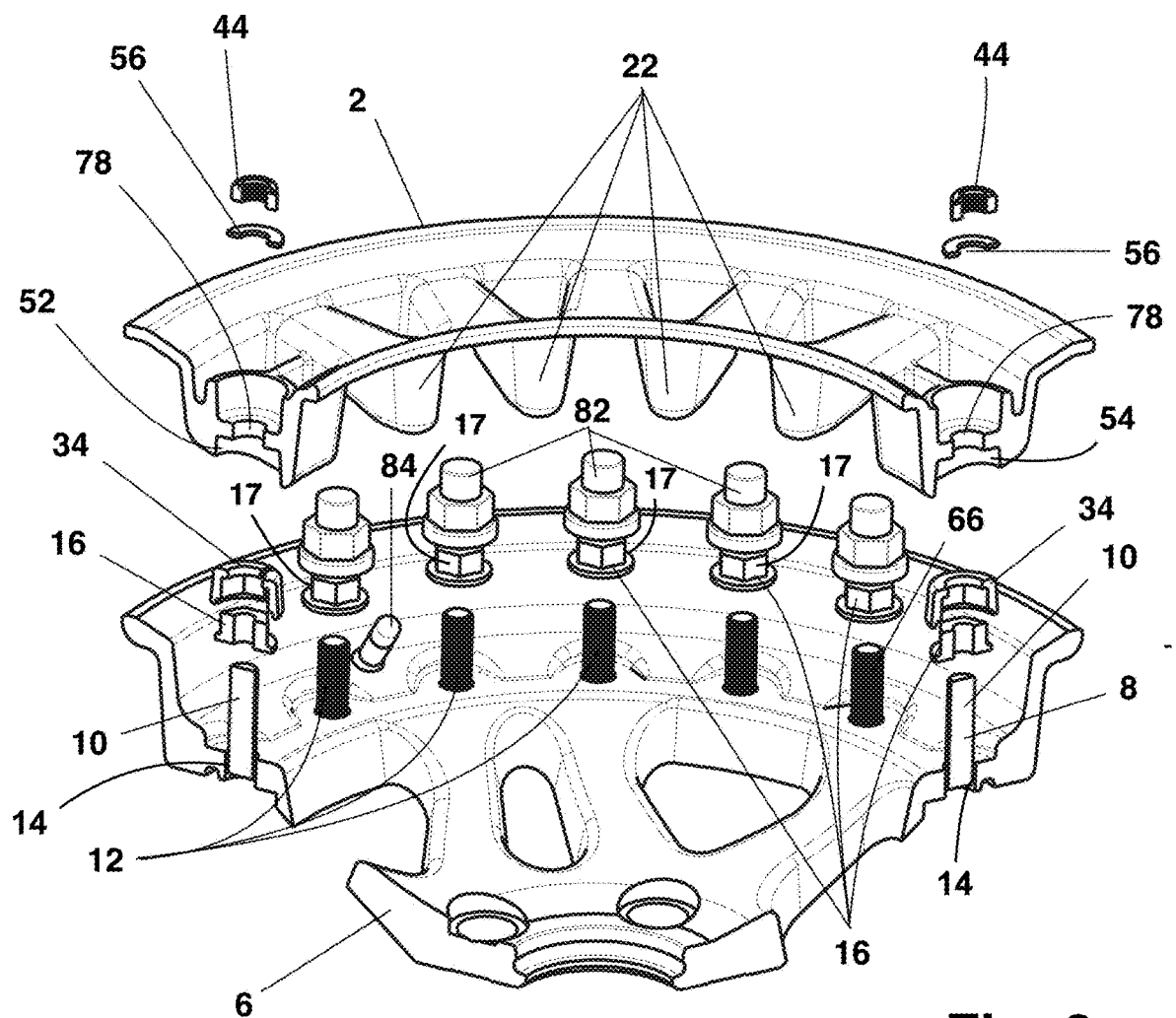
FIG. 6 is a perspective exploded view of the outer rim of the wheel and the wheel protector.

FIGS. 1A and 1B are a left side view and a front view of a prior art outer rim 6 of a two-part wheel 4 for a motor vehicle. The two-part wheel 4 comprises a wheel inner rim and the wheel outer rim 6, such as a two-part wheel 4 manufactured by Hutchinson Industries. The wheel inner rim of the two-part wheel 4 is not shown by FIGS. 1A and 1B and features a plurality of threaded studs 8 (shown by FIG. 6) about the wheel inner rim. The wheel outer rim 6 defines stud openings 14 through which the studs 8 penetrate. Threaded rim nuts 16, shown by FIG. 6, engage the threaded studs 8 and secure the wheel outer rim 6 to the wheel inner rim. A portion, such as three or four, of the threaded studs 8 are long studs 10 and the remainder of the threaded studs 8 are short studs 12, as shown by FIG. 6. The long studs 10 extend farther from the wheel outer rim 6 than the short studs 12. Plastic nut caps 82 may cover the short studs 12 and the threaded rim nuts 16 engaging the short studs 12. The long studs 10 serve to ease the assembly of the two-part wheel 4 and are a safety feature for disassembly of the two-part wheel 4.

A resilient O-ring or other gasket (not shown) seals the junction between the wheel outer rim 6 and wheel inner rim, allowing the two-part wheel 4 to accommodate tubeless tires (not shown). An air valve 84 (shown by FIG. 5) communicates through the wheel outer rim 6 to control the air pressure within a tire mounted to the two-part wheel 4. A resilient bead locker (not shown) may be resiliently retained between opposing beads of the tire to allow the tire to be operated at very low air pressures that otherwise would not be adequate to keep the tire on the two-part wheel 4. When the two-part wheel 4 is mounted to a motor vehicle, the two-part wheel 4 is rotatable about a wheel longitudinal axis 18, shown by FIG. 1A.

Figures 2A, 2B:
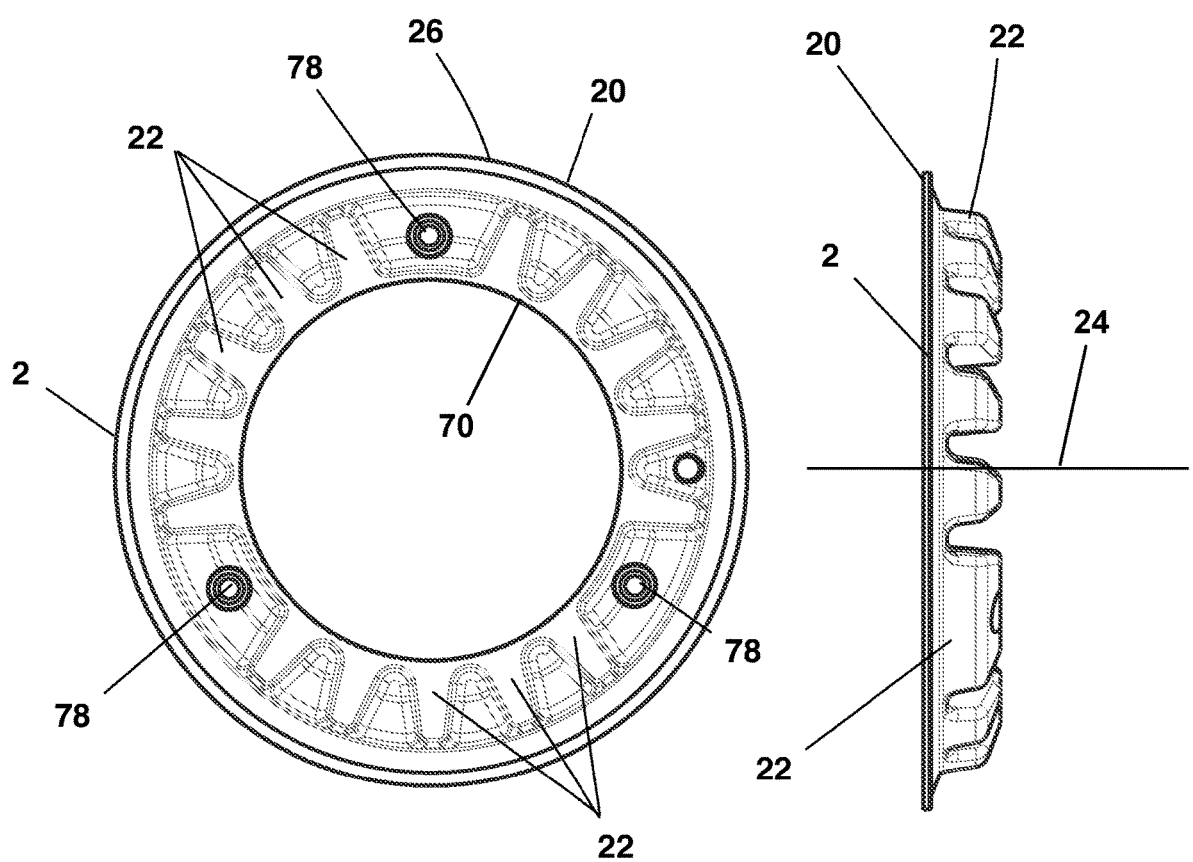
FIG. 2A is a front view of the wheel protector of the Invention.
FIG. 2B is a right side view of the wheel protector of the Invention.
Figure 3:
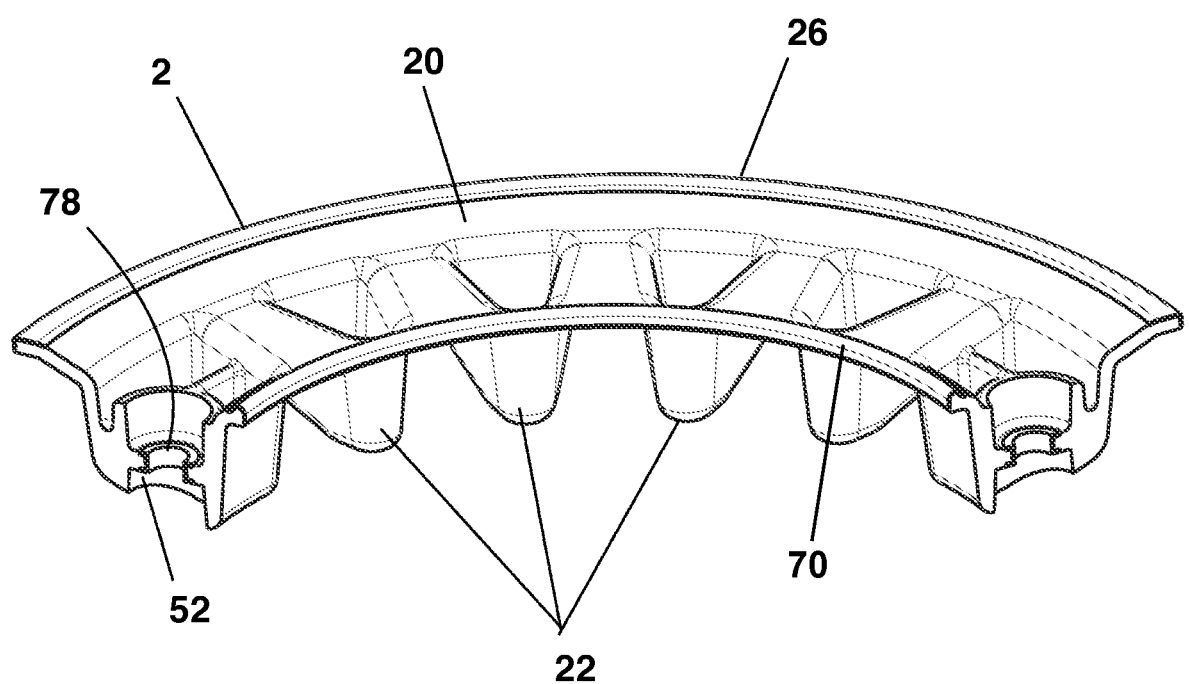
FIG. 3 is a perspective cutaway view of the wheel protector.

FIGS. 2A, 2B and 3 show the wheel protector 2 of the Invention. FIG. 2A is a front view, FIG. 2B is a left side view and FIG. 3 is a partial cutaway perspective view. The wheel protector 2 defines a body 20 having a generally annular shape. The body 20 may be composed of cast aluminum, a polymer, or any other suitable material. The body 20 may be reinforced as by glass, carbon, or aramid fibers, or by metal such as stainless steel. The body 20 defines a plurality of box sections 22. The box sections 22 substantially reinforce the wheel protector 2 in the radial direction and in the direction parallel to the wheel longitudinal axis 18, which are the directions that the wheel protector 2 is most likely to encounter obstacles that otherwise could damage the two-part wheel 4. The box sections 22 also provide clearance between the wheel protector 2 and the plurality of short studs 12 and corresponding threaded rim nuts 16 and plastic nut caps 82, shown by FIG. 6. From FIG. 2B, the wheel protector 2 defines a wheel protector longitudinal axis 24 that is coextensive with the wheel longitudinal axis 18 (FIG. 1A) when the wheel protector 2 is mounted to the two-part wheel 4.

Figure 4:
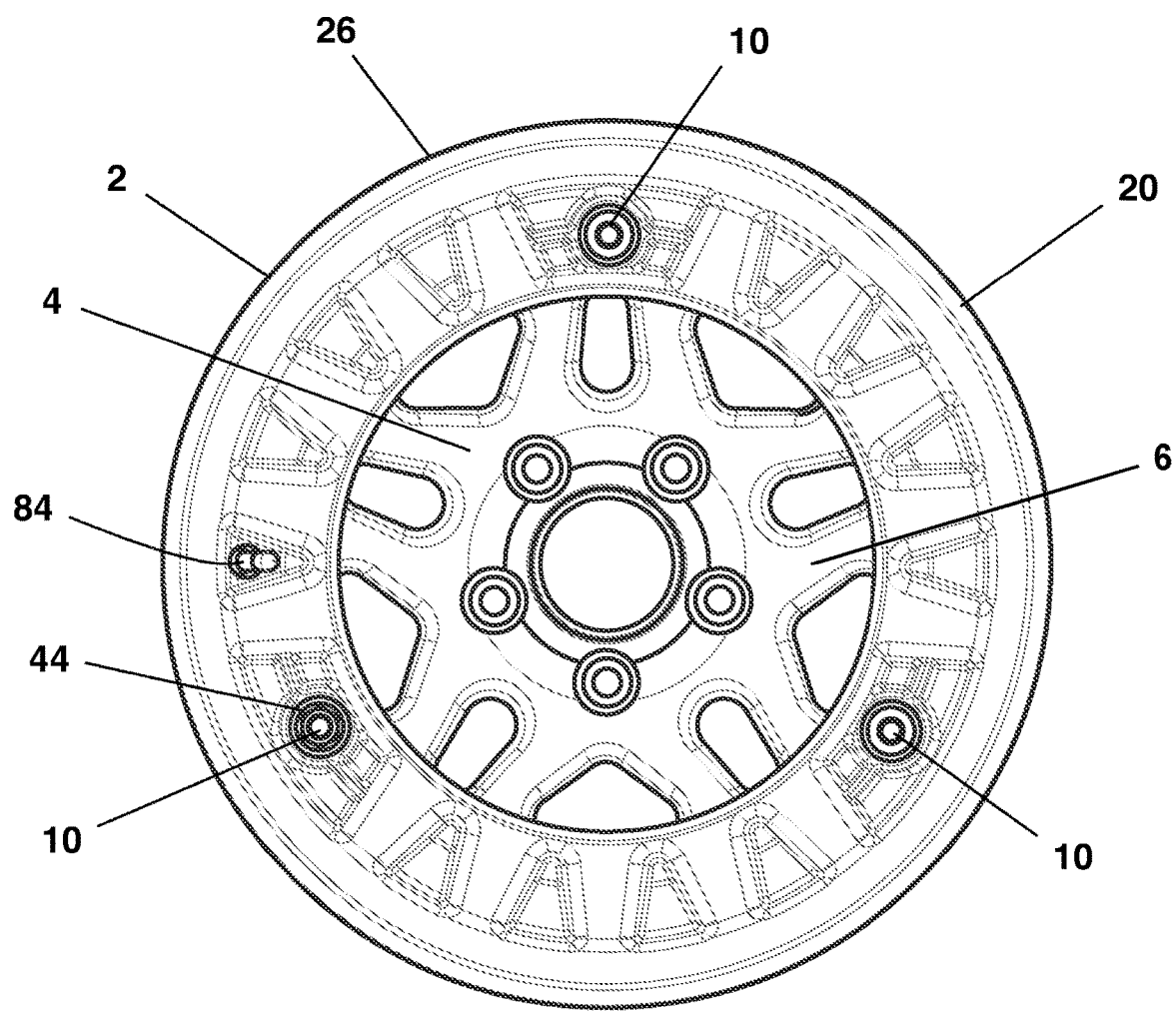
FIG. 4 is a front view of the wheel protector installed on the wheel outer rim of a two-part wheel.
Figure 5:
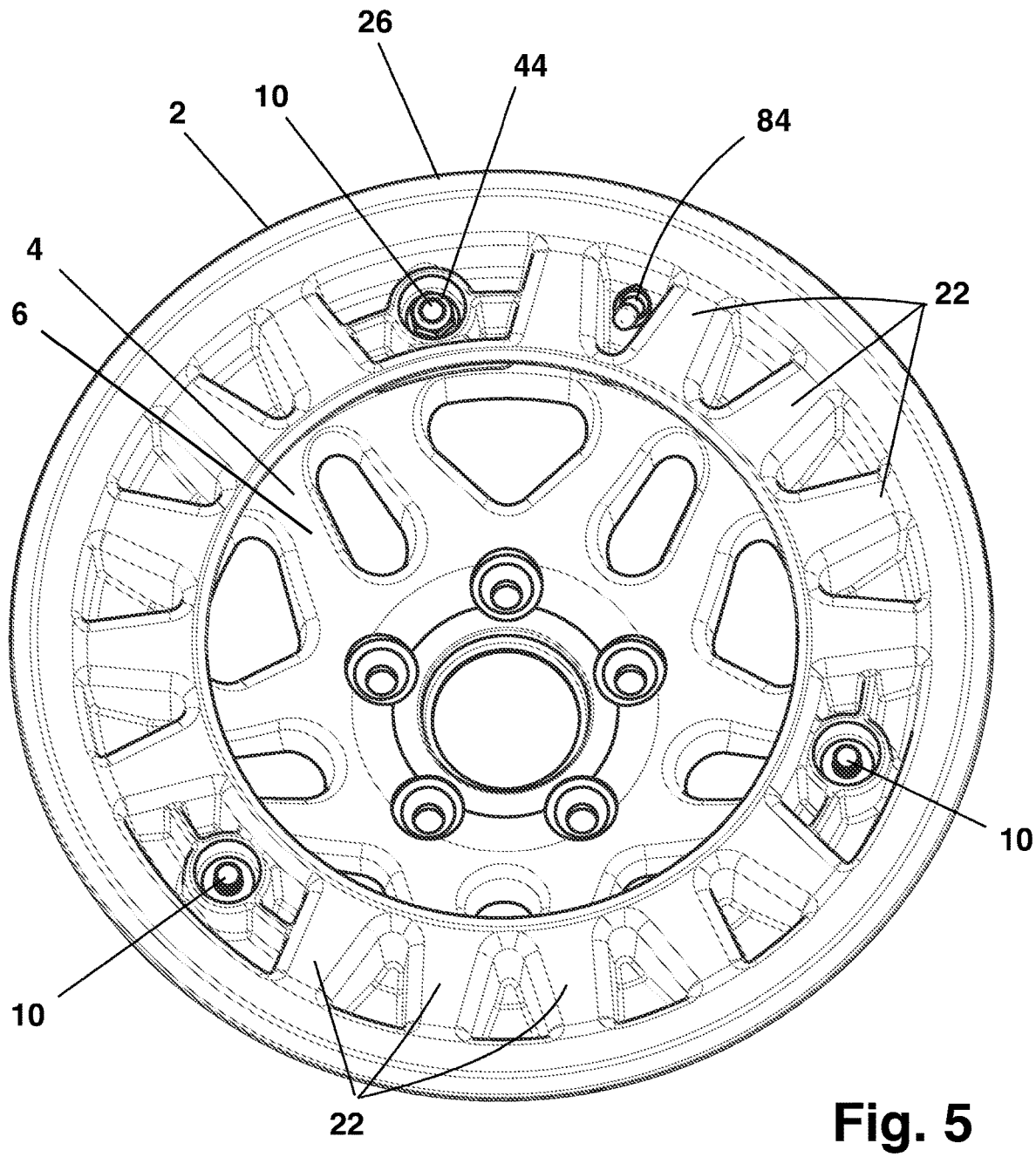
FIG. 5 is an isometric view of the wheel protector attached to the wheel outer rim of a two-part wheel.

FIGS. 4 and 5 are a front view and isometric view, respectively, of the wheel protector 2 attached to the wheel outer rim 6 of the two-part wheel 4. From FIGS. 4 and 5, the wheel protector outside edge 26 has a body outside diameter that may be equal to or greater than the outer rim outside diameter of the two-part wheel 4, shown by FIGS. 1A and 1B. As a result, when the two-part wheel 4 strikes an obstacle, such as a rock, the rock encounters the wheel protector outside edge 26 before the rock strikes the wheel outer edge 32 of the wheel outer rim 6, reducing damage to the wheel outer edge 32. The body outside diameter may be less than the outer rim outside diameter of the wheel outer rim 6.

Figure 7:
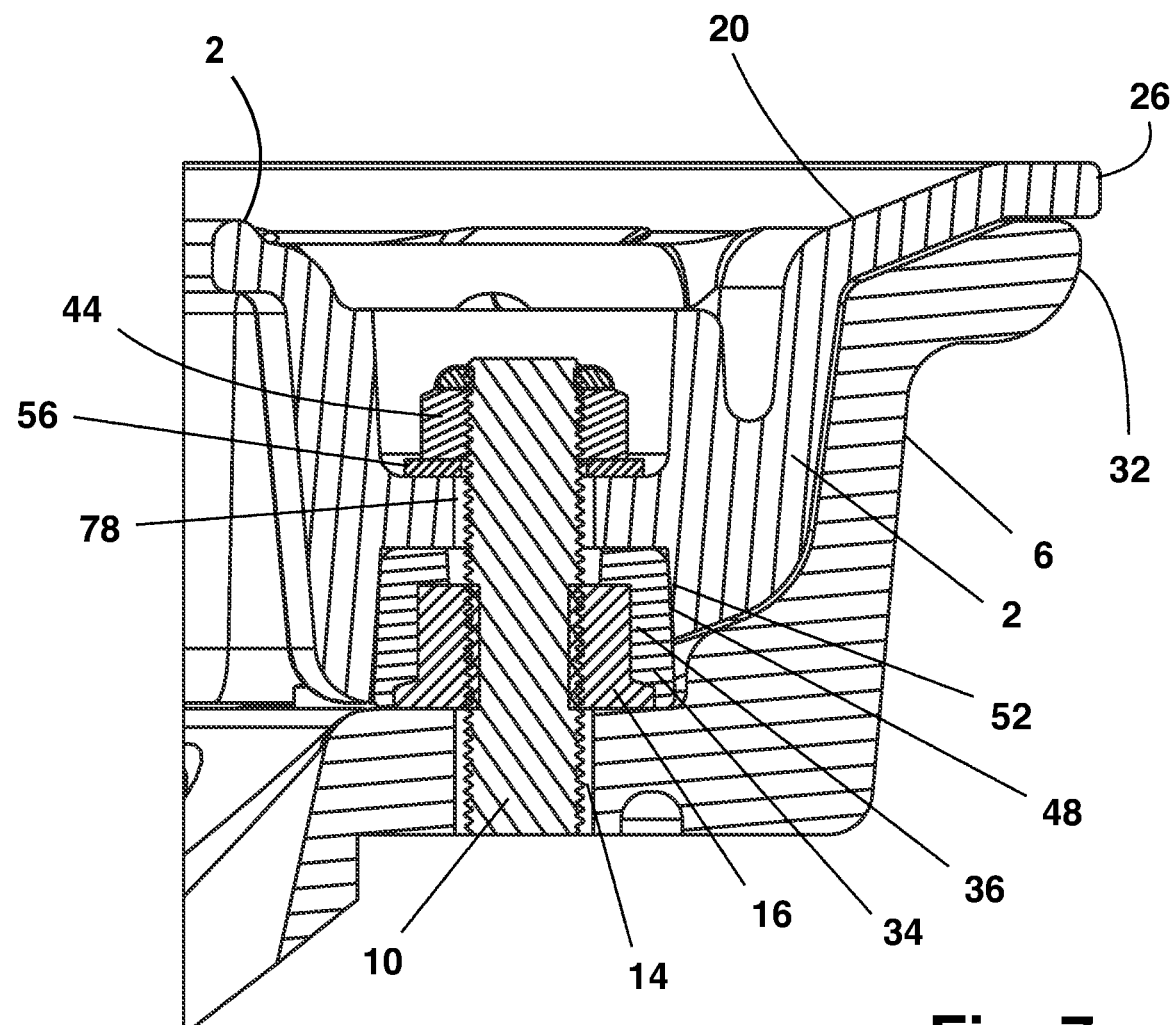
FIG. 7 is a detail section view of the wheel protector installed on the two-part wheel.
Figure 8:
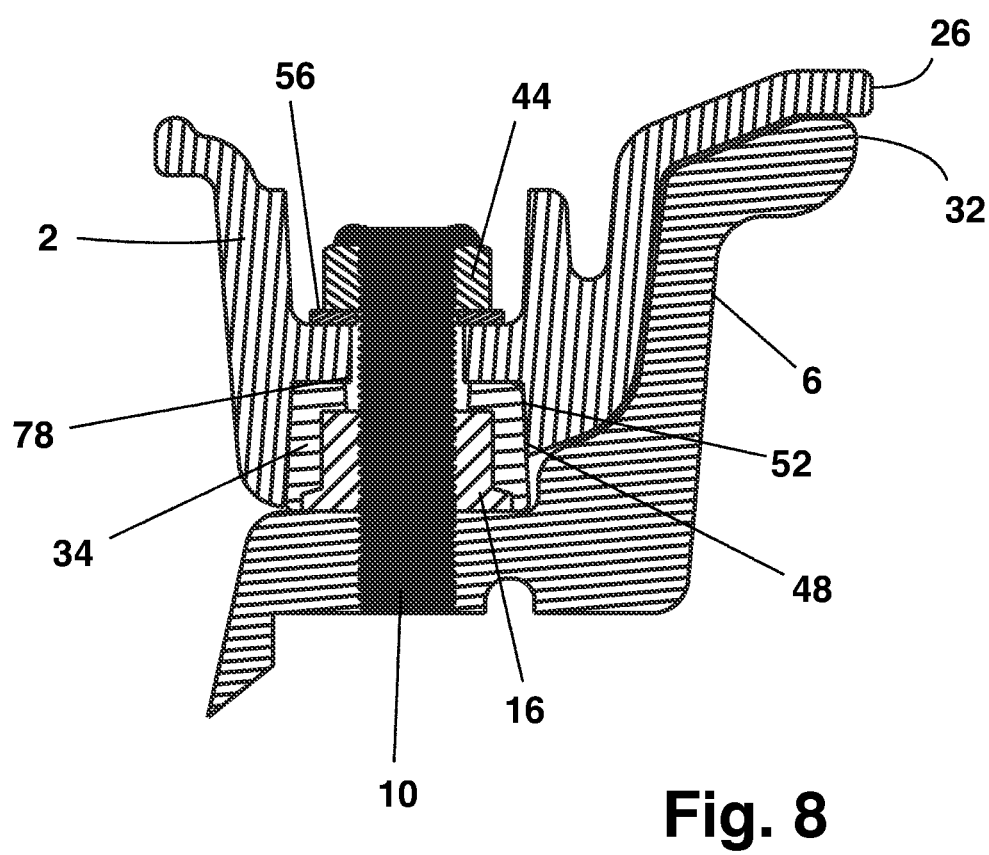
FIG. 8 is an area section view of the wheel protector installed on a two-part wheel.
Figure 9A:
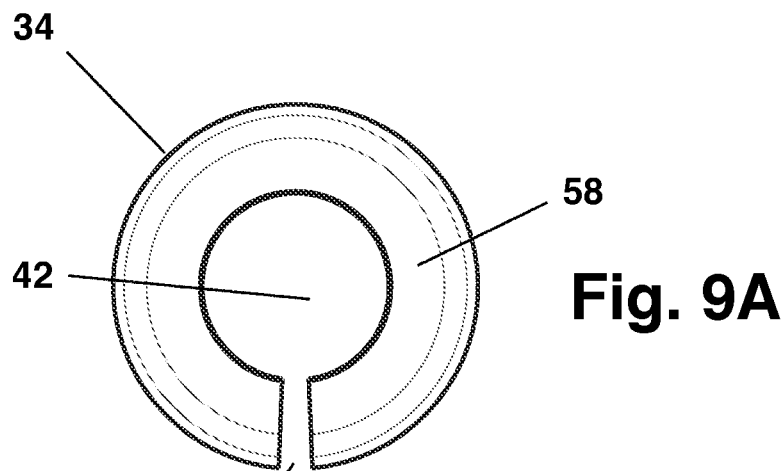
FIG. 9A is a top view of the collar.
Figure 9B:
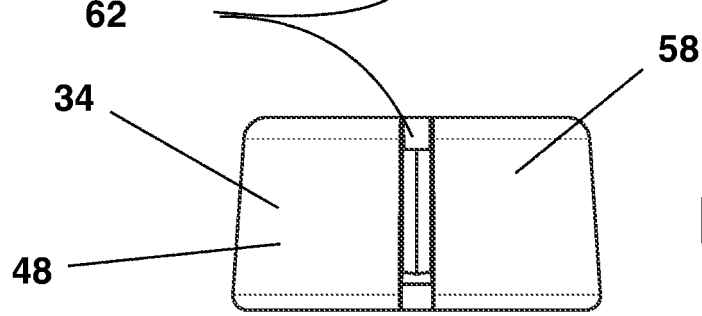
FIG. 9B is a front view of the collar.
Figure 9C:
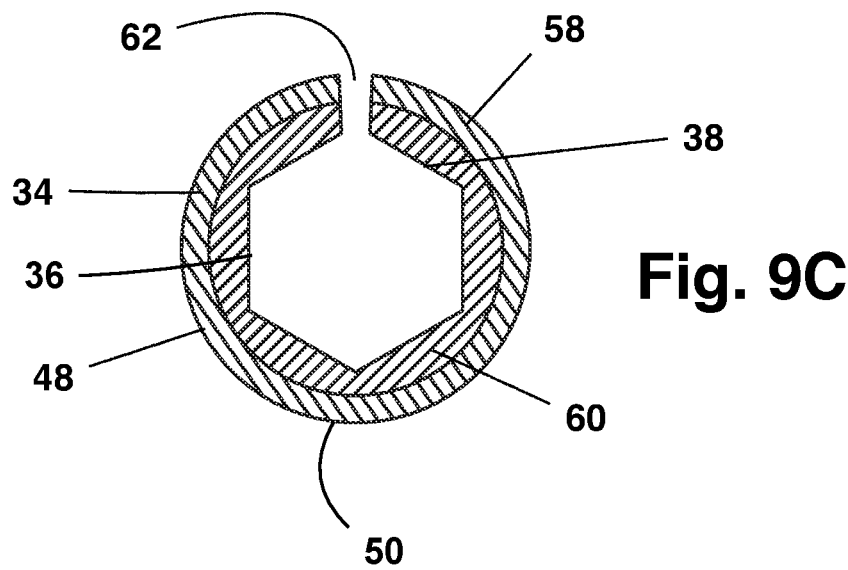
FIG. 9C is a bottom view of the collar.
Figure 10:
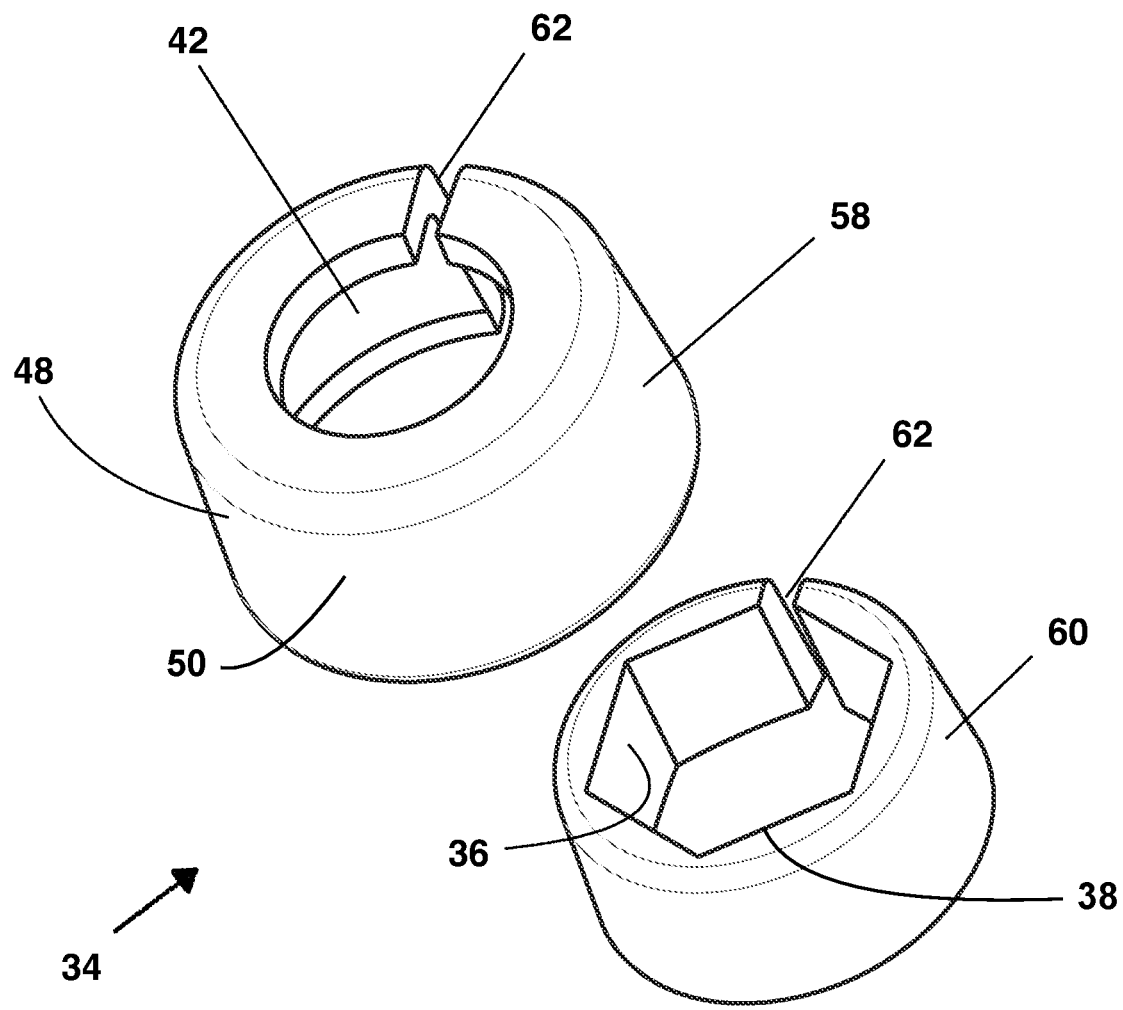
FIG. 10 is an exploded view of the collar.

FIG. 6 is an exploded view and shows the attachment of the wheel protector 2 to the wheel outer rim 6, shown in more detail by FIGS. 7, 8, 9A, 9B, 9C, and the exploded view of FIG. 10. From FIG. 6, long studs 10 attached to the wheel inner rim penetrate the stud openings 14 from the wheel inner rim to the wheel outer rim 6. Threaded rim nuts 16 secure the wheel outer rim 6 to the wheel inner rim. The threaded rim nuts 16 have plurality of rim nut sides 17. FIG. 7 is a section view showing the connection of the wheel inner rim to the wheel outer rim 6 and to the wheel protector 2. FIG. 8 is the section view of FIG. 7 but with surrounding structure removed for clarity. From FIGS. 7 and 8, a long stud 10 passes from the wheel inner rim (not shown) though a stud opening 14 in the wheel outer rim 6. When the wheel protector 2 is attached to the two-part wheel 4, the long stud 10 passes through a collar 34 and through a wheel protector clearance hole 78. A wheel protector nut 44 and washer 56 secure the wheel protector 2 to the long studs 10. The wheel protector nut 44 traps the collar 34 between a wheel protector opening 52 defined by the body 20 and the threaded rim nut 16. The engagement of the collar 34 and the threaded rim nut 16 transfers a force applied radially or torsionally to the wheel protector 2 (as by collision with a rock) to the base of the long stud 10.

When the threaded rim nut 16 is tightened on the long stud 10 during assembly of the two-part wheel 4, the threaded rim nut 16 is rotated and hence the angular orientation of the threaded rim nut 16, the plurality of threaded rim nut sides 17 and hence the threaded rim nut shape 38 changes through a multiplicity of possible rim nut angular orientations. The collar 34, described in more detail with respect to FIGS. 9A, 9B, 9C and 10, defines a collar opening 46 having a collar inside surface 36. The collar inside surface 36 has a collar inside surface shape 38. The collar inside surface shape 38 closely conforms to the threaded rim nut shape for any of the multiplicity of angular orientations of the threaded rim nut 16 on the long stud 10. For example, where the threaded rim nut shape is hexagonal, the collar inside surface shape 38 also is hexagonal. The threaded rim nut shape and the collar inside surface shape 38 may be any other suitable shape, such as square, pentagonal, octagonal, star-shaped, irregular, or any other shape that allows the threaded rim nut 16 to be tightened on the long stud 10.

From FIGS. 7-10, the collar 34 has a cylindrical or tapered collar outside surface 48. The cylindrical or tapered collar outside surface 48 allows the collar inside surface 36 to remain in close engagement with the threaded rim nut 16 by having a collar angular orientation matching the angular orientation of the threaded rim nut 16 for any angular orientation of the threaded rim nut 16. The wheel protector 2 defines a corresponding wheel protector opening 52 having a wheel protector opening shape 54 to receive the collar 34. The wheel protector opening 52 and the collar outside surface 48 are both either cylindrical or tapered so that the wheel protector opening 52 and collar outside surface 48 may matably engage for any angular orientation of the threaded rim nut 16. During assembly, the collar 34 is compressed by the wheel protector opening 52 creating a tight but flexible connection. The tapers allow for easy initial alignment of the wheel protector opening 52 and the collar outside surface 48.

From FIGS. 7 and 8, a wheel protector nut 44 attaches the wheel protector 2 to the long stud 10. A washer 56 may be disposed between the wheel protector nut 44 and the wheel protector 2. When the wheel protector nut 44 is tightened the wheel protector nut 44 advances on the long stud 10. The movement of the wheel protector 2 along the axis of the long stud 10 causes the taper of the wheel protector opening 52 to compresses the collar 34 about the threaded rim nut 16, clamping the collar 34 to the threaded rim nut 16 for any angular orientation of the threaded rim nut 16 and clamping the wheel protector 2 to the collar 34.

As illustrated by FIGS. 7 and 8, when the two-part wheel 4 and wheel protector 2 combination experiences a radial or torsional load, such as by striking a rock, the force applied to the wheel protector 2 is transmitted to the wheel protector opening 52. From the wheel protector opening 52 the force is transferred to the collar 34. From the collar 34, the force is transferred to the threaded rim nut 16, and from the threaded rim nut 16 the force is transferred to the base of the long stud 10 where the long stud 10 emerges from the wheel outer rim 6. Because the force is transmitted to the base of the long stud, the bending moment applied to the long stud 10 is small compared to the same load applied to the tip of the long stud 10. Applying the load to the base of the long stud 10 reduces the opportunity for damage to the long stud 10 from force applied to the wheel protector 2.

The collar 34 may be resilient, such as being composed of a polymer that is more resilient than the body 20, so that the force on the wheel protector 2 is resiliently transferred to the long stud 10, further reducing the likelihood of damage to the wheel protector 2, the long stud 10, or the two-part wheel 4.

FIGS. 9A, 9B, 9C and 10 illustrate an embodiment of the collar 34. FIG. 9A is a top view of the collar 34. FIG. 9B is a front view and FIG. 9C is a bottom view. FIG. 10 is an exploded view of the collar 34. In the embodiment of FIGS. 9A, 9B, 9C and 10, the collar 34 comprises a collar shell 58 and a collar core 60. The collar core 60 may be composed of a resilient material, such as rubber or a synthetic polymer, and may have a core resilience. The collar core 60 may be split as shown by FIGS. 9C and 10 and may be hex-shaped along its length. The collar shell 58 may have a shell resilience and may be stiffer and less resilient than the collar core 60. The collar shell 58 and collar core 60 define a collar clearance hole 42 for the long stud 10. The shell and core also may define a slot 62 allowing the collar 34 to compress about the threaded rim nut 16 when then the wheel protector nut 44 is tightened. The collar core 60 features an inside surface 36 corresponding in shape and size to the threaded rim nut 16. The collar 34 allows the wheel protector 2 to attach to the two-part wheel 4 at the base of the long studs 10 for any angular orientation of the threaded rim nuts 16 attaching the outer rim 6 and inner rim at the long studs 10.

Figure 11:
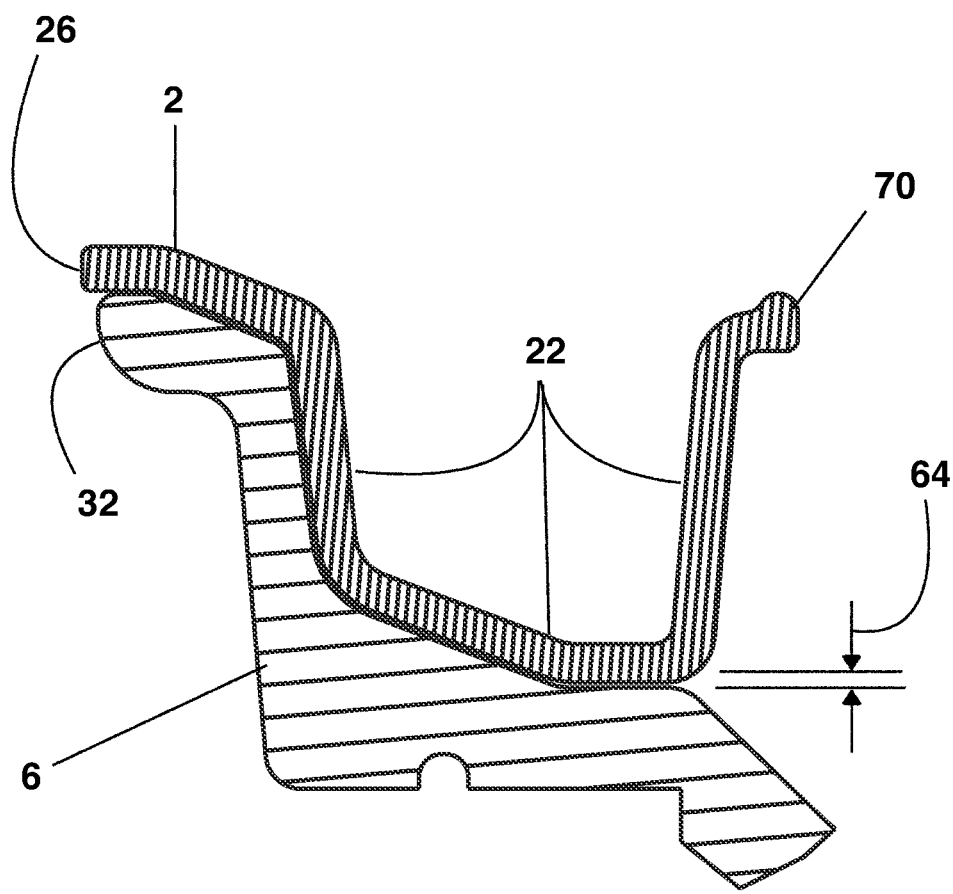
FIG. 11 is a detail section view of the wheel protector installed on a wheel.

FIG. 11 is a detailed section view of the wheel protector 2 attached to the wheel outer rim 6. From FIG. 11, the wheel protector 2 is separated from the surface of the wheel outer rim 6 by a separation distance 64. A separation distance 64 of 0.025-0.050 inches is believed to be suitable. The purpose of the separation distance 64 is to reduce abrasion of the wheel outer rim 6 by the wheel protector 2 and to reduce noise and vibration. The collars 34 will touch the wheel outer rim 6 immediately adjacent to the threaded rim nuts 16, as shown by FIGS. 7 and 8. Otherwise, the wheel protector 2 may not touch the wheel outer rim 6 unless an external force is applied to the wheel protector 2. The body 20 may have a body resilience and the outer rim 6 may have a wheel resilience. The body resilience may be greater than the wheel resilience. Optionally, the wheel protector 2 may contact select locations on the wheel outer rim 6, such as immediately adjacent to the outer edge of the wheel outer rim 6. When an external force is applied to the wheel protector 2, such as a force normal to the wheel disk, the wheel protector 2 may deform until the wheel protector 2 contacts the wheel outer rim 6. For example, the box sections 22 may contact the wheel outer rim 6. The wheel outer rim 6 will prevent further deformation of the wheel protector 2 and will resist the force, while the wheel protector 2 absorbs abrasion from the rock or other obstacle applying the force to the wheel protector 2. The small amount of deformation of the wheel protector 2 before the wheel protector 2 encounters the wheel outer rim 6 reduces fatigue of the wheel protector 2 and extends the life of the wheel protector 2.

Figure 12A:
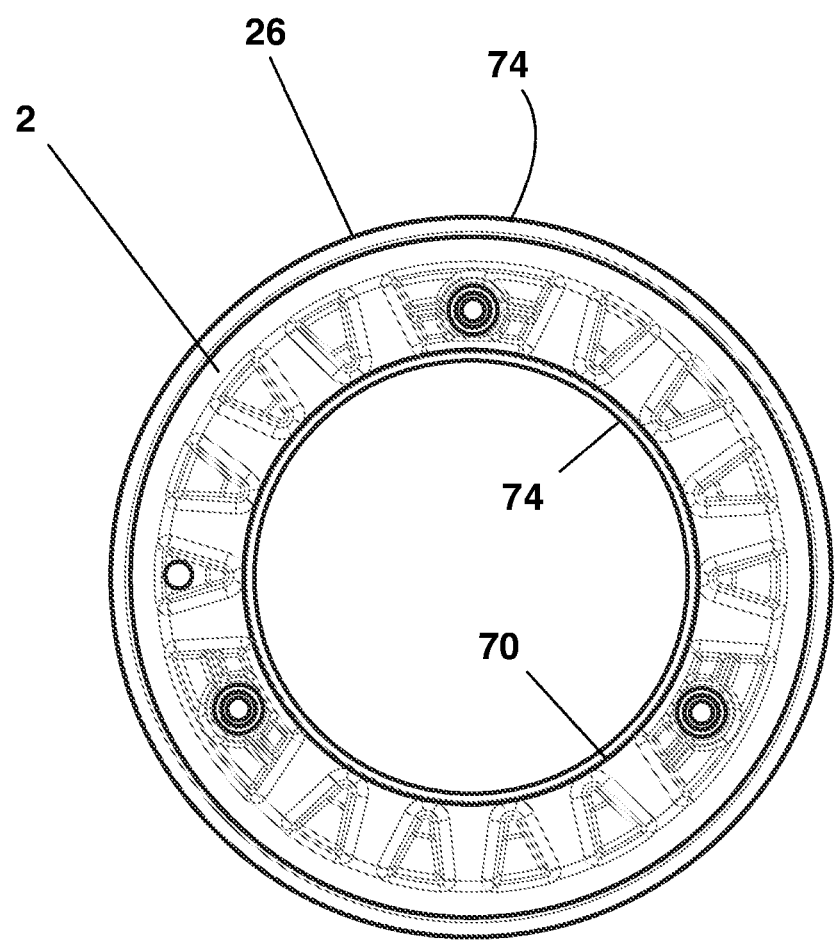
FIG. 12A is a front view of the wheel protector with reinforcements.
Figure 12B:
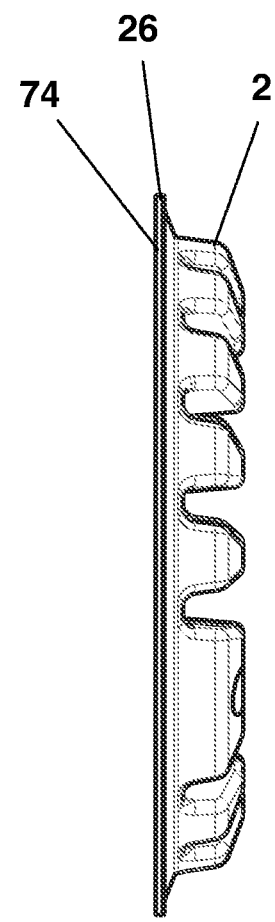
FIG. 12B is a right side view of the wheel protector with reinforcements.

FIGS. 12A, 12B, 13 and 14 illustrate that the wheel protector 2 may be reinforced to better withstand abrasion and to reduce damage to the wheel protector 2 caused by obstacles. FIGS. 12A and 12B are front and right side views of the wheel protector 2 having reinforcements 74 at the wheel protector outside edge 26 and at the wheel protector wheel protector inside edge 70. The reinforcements 74 may include metal, such as stainless steel, or may be a high-strength polymer attached to or incorporated into the material of the wheel protector 2. The reinforcement 74 may or may not be visible to an observer. The body 20 may be composed of a first material 72, such as a polymer, and the reinforcement 74 may be composed of a second material 76, such as a metal or high-strength polymer. The reinforcement 74 may be disposed partially or completely within the body 20. The second material 76 may be stiffer and more resistant to abrasion than the first material 72.

Figure 13:
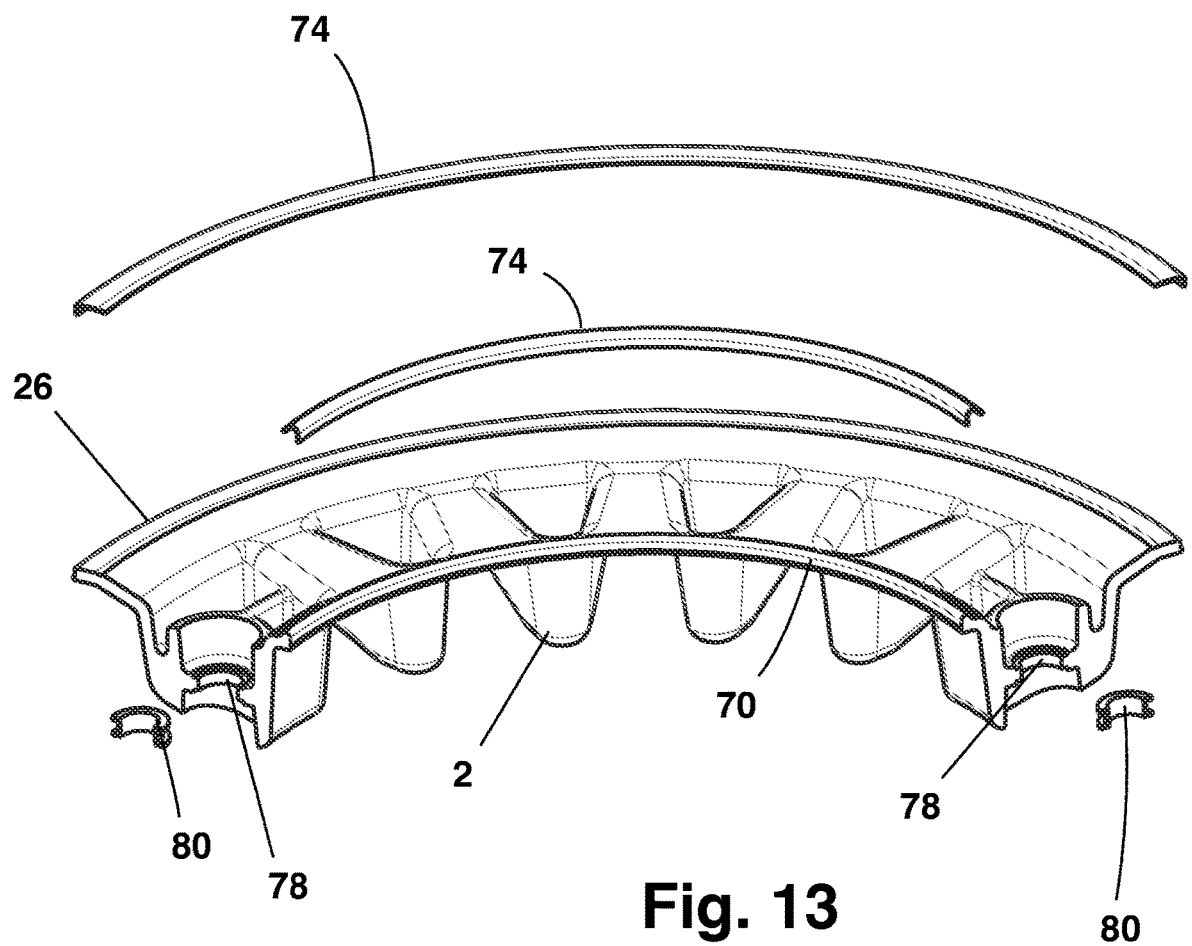
FIG. 13 is a detailed exploded view of the wheel protector with reinforcements.

FIG. 13 is an exploded view of a reinforced embodiment of the wheel protector 2. Reinforcements 74, in this instance stainless steel reinforcements 74, are incorporated into the polymer of the body 20 at the wheel protector outside edge 26 and at the wheel protector inside edge 70. The wheel protector clearance hole 78 to receive the long studs 10 features a wheel protector clearance hole reinforcement 80, which also may be stainless steel. The reinforcements 74 assist in resisting abrasion or penetration of the wheel protector 2 and may extend the life of the wheel protector 2.

Figure 14:
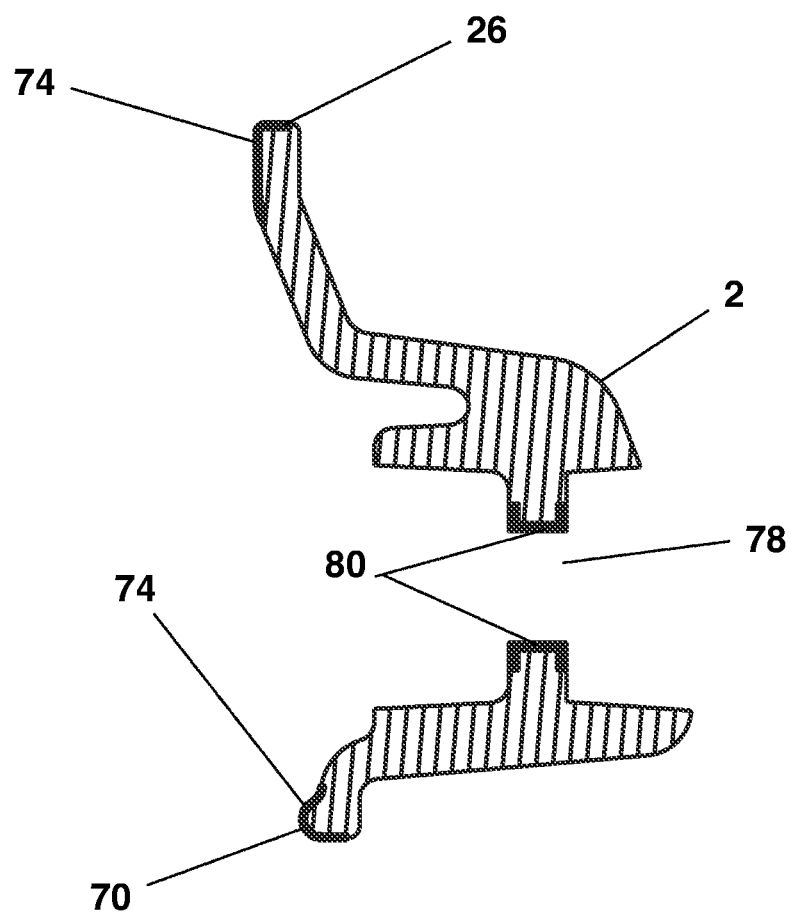
FIG. 14 is an area section view of the wheel protector with reinforcements.

FIG. 14 is a detail section view through the wheel protector 2 showing the reinforcements 74 at the wheel protector outside edge 26, at the wheel protector wheel protector inside edge 70, and the clearance hole reinforcement 80 at the wheel protector clearance hole 78.

When an element number appears in a drawing, the element number has the same meaning when applied to another drawing, unless the context requires otherwise. The following is a list of numbered elements from the drawings and specification:

wheel protector 2
two-part wheel 4
wheel outer rim 6
threaded stud 8 long studs 10
short studs 12
stud opening 14
Threaded rim nut 16
Plurality of rim nut sides 17
Wheel longitudinal axis 18
body 20
Box section 22
wheel protector longitudinal axis 24
Wheel protector outside edge 26
Wheel outer edge 32
collar 34
collar inside surface 36
collar inside surface shape 38
Collar clearance hole 42
wheel protector nut 44
collar opening 46
collar outside surface 48
collar outside surface shape 50
Wheel protector opening 52
wheel protector opening shape 54
washer 56
collar shell 58
collar core 60
slot 62
separation distance 64
Wheel protector inside edge 70
first material 72
reinforcement 74
second material 76
Wheel protector clearance hole 78
Clearance hole reinforcement 80
Plastic nut caps 82
Air valve 84

What is claimed is:

1. A wheel protector for a two-part wheel for a motor vehicle, the wheel protector comprising:
   (a) the two-part wheel having a wheel outer rim and a threaded stud extending from the wheel outer rim, the two-part wheel having a threaded rim nut configured to engage the threaded stud and to secure the wheel outer rim to the two-part wheel, the rim nut having a plurality of rim nut sides, the rim nut sides having a rim nut angular orientation when the rim nut secures the wheel outer rim to the two-part wheel, the rim nut angular orientation being any of a multiplicity of possible angular rim nut orientations when the rim nut secures the wheel outer rim to the two-part wheel;
   (b) a body, the body having a generally annular shape, the body defining a wheel protector clearance hole, the wheel protector clearance hole being configured to receive the threaded stud so that the threaded stud penetrates the wheel protector clearance hole, the body defining a wheel protector opening concentric to the threaded stud when the wheel protector clearance hole receives the threaded stud, the wheel protector opening defining a wheel protector opening inside surface, the wheel protector inside surface being generally cylindrical;
   c) a collar, the collar having a collar clearance hole configured to receive the threaded stud, the collar having a collar inside surface configured to engage the plurality of rim nut sides concentric to the threaded stud so that a collar angular orientation corresponds to the rim nut angular orientation, the collar having an outside surface configured to matably engage the wheel protector opening inside surface, the collar outside surface being generally cylindrical and conforming to the wheel protector inside surface for each of the multiplicity of possible rim nut angular orientations and the corresponding collar angular orientations;
   d) a wheel protector nut configured to threadably engage the threaded stud when the threaded stud penetrates the wheel protector opening, wherein the wheel protector nut secures the body to the collar and the collar to the rim nut sides, thereby securing the body to the two-part wheel for each of the multiplicity of possible angular orientations of the rim nut.

2. The wheel protector of claim 1 wherein the plurality of rim nut sides define a rim nut shape and the collar inside surface defines a collar inside shape, the rim nut shape and the collar inside shape are hexagonal and wherein the rim nut shape and the collar inside shape matably correspond.

3. The wheel protector of claim 2 wherein the collar comprising:
   a) a collar shell, the collar shell defining the collar outside surface;
   b) a collar core, the collar core being configured to fit within the collar shell, the collar core defining the collar inside surface, the collar core have a core resilience and the collar shell having a collar shell resilience, the collar core resilience being greater than the collar shell resilience, whereby a force applied to the wheel protector is resiliently transferred to the plurality of threaded rim nut sides from the collar shell through the collar core.

4. The wheel protector of claim 3 wherein a slot communicates through the collar shell and the collar core.

5. The wheel protector of claim 1 wherein the collar outside surface and the wheel protector opening inside surface are configured for a tapered engagement.

6. The wheel protector of claim 1 wherein the collar has a collar resilience and the body has a body resilience, the collar resilience being larger than the body resilience, wherein a force applied to the wheel protector is resiliently transferred to the plurality of threaded rim nut sides through the collar.

7. The wheel protector of claim 1 wherein the body is separated from the wheel outer rim by a separation distance when the body is attached to the wheel outer rim, the body having a body resilience, the wheel outer rim having a wheel resilience, the body resilience being greater than the wheel resilience, whereby when a sufficient a force is applied to the body parallel to a body longitudinal axis the body will deform and contact the wheel outer rim.

8. The wheel protector of claim 1 wherein the body is composed of a first material and wherein wherein the body further comprises: a reinforcement, the reinforcement being composed of a second material, the second material being stiffer and more resistant to abrasion than the first material, the second material disposed completely or partially within the first material.

9. The wheel protector of claim 8 wherein the body defines a wheel protector outside edge and a wheel protector inside edge, the wheel protector outside edge being disposed at a greater distance from the body longitudinal axis than the wheel protector inside edge, the reinforcement being disposed at the wheel protector inside edge or the wheel protector outside edge.

10. The wheel protector of claim 8 wherein the reinforcement is disposed at the two or more wheel protector clearance holes.

11. The wheel protector of claim 1 wherein the body defines a body outside diameter and the two-part wheel defines an outer rim outside diameter, the body angular outside diameter being greater than the outer rim outside diameter.

12. A wheel protector for a two-part wheel for a motor vehicle, the wheel protector comprising:
    a) a body, the body having a generally annular shape, the body having a configuration for selectable attachment to the two-part wheel, the two-part wheel having a wheel outer rim and a threaded stud extending from the wheel outer rim, the two-part wheel having a threaded rim nut configured to engage the threaded stud and to secure the wheel outer rim to the two-part wheel, the threaded rim nut defining a rim nut shape that varies by an angular orientation of the threaded rim nut when the threaded rim nut engages the threaded stud, the two-part wheel being configured to rotate about a wheel longitudinal axis when the two-part wheel is attached to the motor vehicle, the body defining a wheel protector longitudinal axis, the wheel protector longitudinal axis and the wheel longitudinal axis being coextensive when the body is attached to the two part wheel, the configuration of the body for selectable attachment to the two-part wheel comprising that the body is selectably attachable to the threaded stud;
    b) a wheel protector clearance hole defined by the body, the wheel protector clearance hole corresponding to the threaded stud and configured to receive the threaded stud so that the threaded stud penetrates the wheel protector clearance hole;
    c) a wheel protector nut configured to threadably engage the threaded stud when the threaded stud penetrates the wheel protector opening, the wheel protector nut being configured to secure the body to the threaded stud;
    d) a collar, the collar having a collar opening defining a collar inside surface, the collar opening being configured to receive the rim nut when the rim nut engages the threaded studs and secures the wheel outer rim to the two-part wheel, the collar inside surface having a collar inside surface shape, the collar inside surface shape corresponding to the rim nut shape so that the collar inside surface receives the rim nut only when the collar inside surface shape is in angular alignment with the rim nut shape;
    e) wherein the collar has a collar outside surface having a collar outside surface shape and wherein each wheel protector opening has a wheel protector opening shape, each collar outside surface shape and each wheel protector opening shape being configured for mutual engagement for any relative angular orientation of the collar and the wheel protector opening, whereby the collar selectably engages both the rim nut and the body for any angular orientation of the rim nut when the body is attached to the two-part wheel, wherein the threaded stud comprises two or more long studs and a plurality of short studs, the threaded rim nut comprises a plurality of threaded rim nuts, the wheel protector clearance hole comprises a plurality of wheel protector clearance holes, the wheel protector nut comprises two or more wheel protector nuts, and the collar comprises two or more collars, each of the plurality of short studs being configured to extend through a corresponding stud opening in the wheel outer rim, a one of the threaded rim nuts corresponding to each of the plurality of short studs and two or more long studs, each of the threaded rim nuts being configured to engage a one of the short studs and long studs and to secure the wheel outer rim to the two-part wheel.

13. The wheel protector of claim 12 wherein the body defines a plurality of box sections, each of the box sections is disposed about a one or more of the short studs when the wheel protector is attached to the two-part wheel.

14. A method of protecting a two-part wheel for a motor vehicle, the method comprising:
    a) obtaining a two-part wheel, the two-part wheel being configured to rotate about a wheel longitudinal axis when the two-part wheel is attached to the motor vehicle, the two-part wheel having a wheel outer rim, the two-part wheel having two or more threaded studs extending from the wheel outer rim and two or more threaded rim nuts engaging the threaded studs and securing the wheel outer rim to the two-part wheel, the two or more rim nuts each having a plurality of rim nut sides, the rim nut sides of each of the two or more rim nuts having a rim nut angular orientation when the rim nut secures the wheel outer rim to the two-part wheel, the rim nut angular orientation being any of a multiplicity of possible angular rim nut orientations when the rim nut secures the wheel outer rim to the two-part wheel;
    (b) obtaining a wheel protector, the wheel protector having a body, the body having a generally annular shape, the body defining a wheel protector clearance hole, the wheel protector clearance hole being configured to receive a one of the two or more threaded studs so that the threaded stud penetrates the wheel protector clearance hole, the body defining a wheel protector opening concentric to the threaded stud when the wheel protector clearance hole receives the threaded stud, the wheel protector opening defining a wheel protector opening inside surface, the wheel protector inside surface being generally cylindrical, the wheel protector including a collar, the collar having a collar clearance hole configured to receive the threaded stud, the collar having a collar inside surface configured to engage the plurality of rim nut sides concentric to the threaded stud so that a collar angular orientation corresponds to the rim nut angular orientation, the collar having an outside surface configured to matably engage the wheel protector opening inside surface, the collar outside surface being generally cylindrical and conforming to the wheel protector inside surface for each of the multiplicity of possible rim nut angular orientations and the corresponding collar angular orientations, the wheel protector including two or more wheel protector nuts configured to threadably engage the threaded stud when the threaded stud penetrates the wheel protector opening, wherein the wheel protector nut secures the body to the collar and the collar to the rim nut sides, thereby securing the body to the two-part wheel for each of the multiplicity of possible angular orientations of the rim nut; and
    c) attaching the wheel protector to the two-part wheel by attaching the body to the two or more threaded studs.

15. The method of claim 14 wherein the collar further comprising:
    a) a collar shell, the collar shell defining the collar outside surface;
    b) a collar core, the collar core being configured to fit within the collar shell, the collar core defining the collar inside surface, the collar core have a core resilience and the collar shell having a collar shell resilience, the collar core resilience being greater than the collar shell resilience, whereby a force applied to the wheel protector is resiliently transferred to the plurality of threaded rim nut sides from the collar shell through the collar core.

16. The method of claim 14 wherein the plurality of rim nut sides define a rim nut shape and the collar inside surface defines a collar inside shape, the rim nut shape and the collar inside shape are hexagonal, and wherein the rim nut shape and the collar inside shape matably correspond.

* * * * *